United States Patent [19]

Akiyama et al.

[11] Patent Number: 5,428,711
[45] Date of Patent: Jun. 27, 1995

[54] SPATIAL LIGHT MODULATOR AND NEURAL NETWORK

[75] Inventors: Koji Akiyama; Akio Takimoto, both of Osaka; Hisahito Ogawa, Nara, all of Japan

[73] Assignee: Matsushita Electric Industrial Co., Ltd., Kadoma, Japan

[21] Appl. No.: 818,674

[22] Filed: Jan. 9, 1992

[30] Foreign Application Priority Data

Jan. 9, 1991 [JP] Japan .................................. 3-001146

[51] Int. Cl.⁶ ........................ G02F 1/135; G06F 15/76
[52] U.S. Cl. ........................................................ 395/25
[58] Field of Search .......................................... 395/25

[56] References Cited

U.S. PATENT DOCUMENTS

| 4,941,735 | 7/1990 | Moddel et al. | 395/25 |
| 5,056,897 | 10/1991 | Akiyama et al. | 395/25 |
| 5,056,897 | 10/1991 | Akiyama et al. | 395/25 |
| 5,063,531 | 11/1991 | Kawai et al. | 395/25 |
| 5,131,055 | 7/1992 | Chao | 395/25 |

FOREIGN PATENT DOCUMENTS

| 0375165 | 6/1990 | European Pat. Off. | 395/25 |
| 0405974 | 1/1991 | European Pat. Off. | |
| 62-169120 | 4/1987 | Japan | |

OTHER PUBLICATIONS

J. Till, Electronic Design, vol. 37, No. 12 (Jun. 8, 1989), p. 27.
I. Shariv et al., *All Optical Neural Network With Inhibitory Neurons*, Optics Letters, vol. 14, No. 10 pp. 485–487 (1989).

*Primary Examiner*—Allen R. MacDonald
*Assistant Examiner*—Stuart B. Shapiro
*Attorney, Agent, or Firm*—Willian Brinks Hofer Gilson & Lione

[57] ABSTRACT

A neural network system comprising input, intermediate and output layers interconnected through synapses, respectively is disclosed.

Each layer is comprised of a plurality of spatial light modulator units each of which is comprised of a photoconductive layer sandwiched between electrodes and a light modulation layer electrically connected to the photoconductive layer of which the light transmittance varies according to a voltage applied thereto, wherein electric currents induced by light bundles incident to the photoconductive layer are summed to cause a change in the voltage to be applied to the light modulation layer according to which the light transmittance is varied dependently thereon.

5 Claims, 8 Drawing Sheets

Input layer    Int. layer    Output layer

Fig.10(b)

SPATIAL LIGHT MODULATOR AND NEURAL NETWORK

BACKGROUND OF THE INVENTION

The present invention relates to a spatial light modulator used in optical information processing equipment, and to a neural network circuit which performs input/output operations resembling those of the nervous system for use in such applications as pattern recognition, associative memory, and parallel processing.

Spatial light modulators are an essential component in optical logic operations, optical neurocomputing, and other optical operations. Optically addressed-type spatial light modulators, in particular, differ from linear sequence driven electrically addressed-types, and can be used for parallel processing of two-dimensional information, thus leading to expected applications in high speed image processing, operations which can be very time-consuming on conventional computing devices. Optical writing-type spatial light modulators such as these feature a photoconductive layer combined with a component (hereinafter the modulation component) the light transmittance of which varies according to an electrical field applied thereto.

Figure 11:
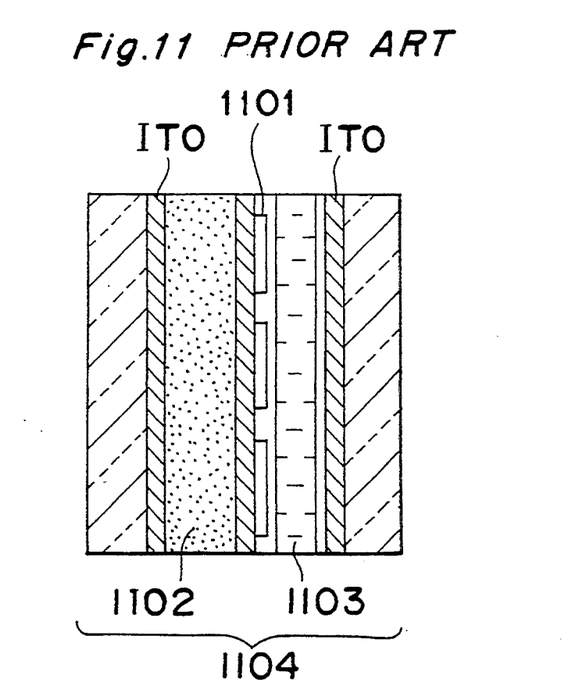
FIG. 11 is a cross-sectional view of a conventional spatial light modulator.

In FIG. 11, there is shown a spatial light modulator 1104 wherein a photoconductive layer 1102 having a reflection metal film 1101 and a liquid crystal layer 1103 are combined with each other (See Japanese patent laid-open publication SHO62-169120). The conventional device of this type utilizes the non-linear input to output characteristics (threshold characteristics) of the liquid crystal and, thereby, performs thresholding operation to light incident upon the photoconductive layer 1102 (See I. Shariv, and A. A. Friesem: Optics Letters Vol. 14(10), 1989, PP. 485 to 487).

Recent neurocomputers modelled on the nerve network of living organisms have attracted attention due to the ability, using these, to easily achieve associative linkage, fuzzy processing, and program-less functions, functions which are difficult to achieve with conventional von Neumann computers. The greater part of any neurocomputer today consists of a program running on a conventional von Neumann computer, but it is essential to construct a neurocomputer in hardware if a wide range of neurocomputer applications is to be developed.

One direction which can be taken in hardware is the optical neurocomputer, a device which uses light as the data medium. This is because the parallelism of light is suited to the operation of a neurocomputer which performs operations using the parallel dynamics of plural neurons. Light also enables high speed operation, and optical interconnection, which does not require hard wiring similar to electrical circuits for transmission, facilitates the implementation of multiple connections between neurons and thus simulates synapses. Light as a data medium thus offers many features which cannot be achieved with LSI and other devices which use electricity as the data medium. As a result, various optical neurocomputer designs have been proposed.

One operation which is basic to neurocomputing is to obtain the sum of plural input data entering the neuron, and to perform thresholding operation on the result. Building a spatial light modulator with this operating function is the single most important step in developing a neurocomputer in hardware.

However, there are no proposals in the prior art for a spatial light modulator with optical summation and optical thresholding operation or for an optical neurocomputer using such devices. In a conventional optical neural network system, the optical summation is done electrically using light collection by lenses or diffraction devices or a light detector array, and the thresholding operation of the optical neurocomputer uses an electronic circuit after photoelectric conversion by light receiving devices.

In the case of the conventional spatial light modulator 1104 shown by way of example in FIG. 11, it is impossible to perform exact optical summation for a plurality of light bundles incident to the reflection metal layer 1101 with a variety of light intensities, because the photoconductivity $\sigma_{ph}$ of the photoconductive layer 1102 is not proportional to the intensity of the incident light $I_{ph}$. In other words, in an equation $\sigma_{ph} \propto I_{ph}^a$, the index "a" is quite different from 1.0. In such a case wherein the photoconductive layer does not satisfy the condition a=1.0, lenses and diffraction devices are used to collect a plurality of light bundles onto a point on the photoconductive layer in order to perform the optical summation. However, according to this method, it is difficult to miniaturize the system since distances are needed to be maintained between the photoconductive layer and lenses or diffraction devices. Further, it gives low yield, poor mass manufacturability and accordingly high costs due to reasons for necessity of taking alignment between the photoconductive layer and lenses or diffraction devices and fabricating various lenses and diffraction devices of micron order in an accurate manner.

Electronic circuits or computers have therefore been used for thresholding operation in conventional optical neurocomputers because of the lack of a spatial light modulator with optical summation and thresholding operation functions. Advanced intelligent data processing functions simulating human recognition and association have been reported to be based on the hierarchical structure of the neural network, but unless we have access to spatial light modulators capable of performing optical summation and optical thresholding operation operations, any hierarchical structure network will require an opto-electric conversion and electro-optical conversion each time thresholding operation is performed. This necessitates a complex electrical circuit, prevents full use of the parallel properties of light, and effectively lowers the operating speed.

SUMMARY OF THE INVENTION

Therefore, an object of the present invention is to provide a spatial light modulator which can perform optical summation and thresholding operations with a simple construction and features good mass manufacturability for low unit costs, and to provide a neural network which can be used to easily construct a hierarchical network model for high speed operation.

A spatial light modulator according to the present invention comprises a photoconductive layer sandwiched by conductive electrodes and a light modulation layer electrically connected to said photoconductive layer wherein the light transmittance is changed by an electrical field applied thereto, and is characterized by the photoconductivity $\sigma_{ph}$ of said photoconductive layer being proportional to the power "a" of the incident light intensity $I_{ph}$ where "a" is a value greater than or equal to 0.95 and less than or equal 1.

A neural network circuit according to the present invention comprises an input layer consisting of a plurality of spatial light modulator units, into each of which light information is input, at least one intermediate layer consisting of a plurality of spatial light modulator units, each of which is connected through synapses to outputs of those of said input layer, and an output layer consisting of a plurality of spatial light modulator units, each of which is connected through synapses to outputs of those of said at least one intermediate layer, being characterized in that each of said spatial light modulator units is comprised of a photoconductive layer sandwiched between electrically conductive electrodes and a light modulation layer electrically connected to said photoconductive layer, the light transmittance of which is varied according to a voltage applied thereto.

The photoconductivity $\sigma_{ph}$ of said photoconductive layer is proportional to $I_{ph}$ ($\sigma_{ph} \alpha I_{ph}^a$) wherein $I_{ph}$ is an intensity of light incident to said photoconductive layer and "a" is a value within a range from 0.95 to 1.0, whereby light bundles incident to said photoconductive layer are summed as photocurrents induced thereby and, therefore, said voltage to be applied to said light modulation layer is varied responsive to the sum of said photocurrents induced to yield a light transmittance dependent on the total power of said incident light bundles.

In a construction whereby the photoconductive layer and the light modulation layer are electrically directly connected, the electrical resistance of the photoconductive layer increases when light is not incident upon the photoconductive layer and a voltage is applied from an outside source, and this external voltage is therefore applied primarily to the photoconductive layer. When light of an intensity greater than a predetermined level is incident upon the photoconductive layer, the electrical resistance of the photoconductive layer drops, the external voltage is thus applied to the modulation layer, and the light passing through the modulation layer can be switched. Specifically, an optically addressed-type element can be achieved, and if the modulation layer is a liquid crystal or other device with non-linear input/output characteristics, an optically thresholding operation function can also be achieved.

Furthermore, the relationship between the photoconductivity of the photoconductive layer (or the photoelectric current) and the incident light intensity is defined by Equation 1 ($\sigma_{ph} \propto I_{ph}^a$). When the exponent "a" of Equation 1 is 1, the optical summation of plural light bundles incident upon the photoconductive layer can be obtained as a sum of photocurrents caused by the plural light bundles in the photoconductive layer between conductive electrodes because the photoconductivity of the photoconductive layer is proportional to the incident light intensity and, accordingly, the light transmittance of the light modulation layer is varied because the voltage applied thereto is varied in response to a value of the sum of photocurrents. Thus, a precise optical summation can be obtained with an extremely simple construction, and mass manufacturability can be increased and unit cost decreased because there are no unresolved technical problems complicating the manufacture of such an element.

By arraying plural spatial light modulators in parallel, optical thresholding operation can be performed simultaneously in parallel, and operations can be performed faster than when using conventional electronic computers or electronic circuits. Furthermore, because these spatial light modulators operate in a transmission mode, a hierarchical neural network can be constructed with a simple optical system by simply layering the elements with an optical mask according to the synapse connection pattern, and such intelligent processing functions as recognition and association common to animals can be easily achieved.

BRIEF DESCRIPTION OF THE DRAWINGS

The present invention will become more fully understood from the detailed description given below and the accompanying diagrams wherein:

FIG. 1 (a) is a cross section for showing an essential structure of a spatial light modulator according to the present invention, and FIG. 1 (b) is an equivalent circuit thereof.

DESCRIPTION OF PREFERRED EMBODIMENTS

Figure 1A:
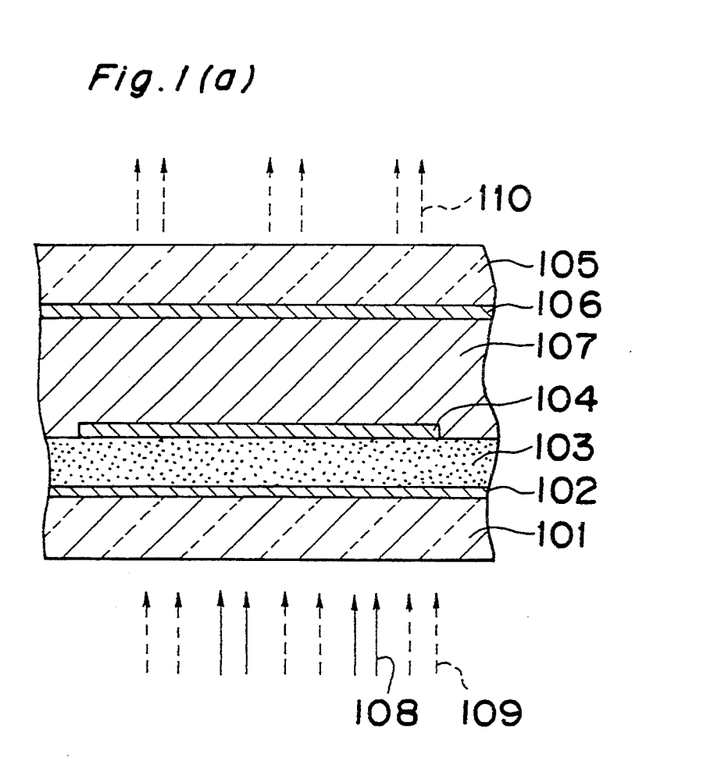
Figure 1B:
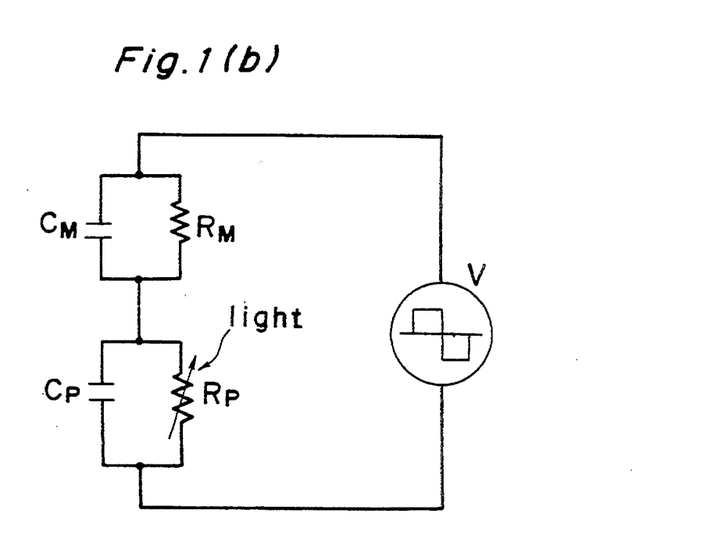

The preferred embodiments of the present invention are described hereinbelow with reference to the accompanying figures, of which FIG. 1 illustrates the preferred embodiment of a spatial light modulator. FIG. 1 shows a transmission type construction, FIG. 1(a) being a cross section and FIG. 1(b) being an equivalent circuit diagram.

This modulator comprises a transparent insulation substrate 101 (e.g., glass) over which are formed a transparent conductive electrode 102 (of ITO or $SnO_x$), a photoconductive layer 103 formed on the electrode 102, a transparent conductive electrode 104 formed on the photoconductive layer 103; a light modulation layer 107 formed on the transparent electrode 104 and another transparent insulation substrate 105 with a transparent conductive electrode 106 formed on the underside thereof and, thereby, the light modulation layer 107 is sandwiched between the photoconductive layer 103 and the upper substrate 105 via the transparent electrodes 104 and 106, respectively.

The operation of this spatial light modulator is described with reference to FIGS. 1(a) and 1(b). An AC voltage V is applied between the electrodes 102 and 106 and, accordingly, as shown in FIG. 1(b), is applied to the photoconductive layer 103 having a capacitance Cp and a resistance Rp and the light modulation layer 107 having a capacitance $C_M$ and a resistance $R_M$. In a state that the photoconductive layer 103 is not illuminated by light, the AC voltage V is applied more to Cp and Rp of the photoconductive layer 103 than to $C_M$ and $R_M$ of the light modulation layer 107. When light 108 is incident upon the photoconductive layer 103, the resistance Rp thereof drops and, thereby, the voltage V is applied more to $C_M$ and $R_M$ of the light modulation layer. Namely, READOUT light 109 passing through the light modulation layer 107 is modulated by the incident light 108. Accordingly, the intensity of the output light 110 is dependent on the intensity of the input light 108. Thus, this element functions as an optically addressed-type spatial light modulator.

Furthermore, the optical summation is performed on the light incident to the lesser area of the transparent conductive electrodes 102 and 104 sandwiching the photoconductive layer 103.

The photoconductive layer 103 has incident light with a value of the power "a" equal to or very close to 1.0 and, therefore, it becomes possible to execute a summation for incident light bundles incident upon the electrode 104 and to perform a suitable processing for the result obtained according to the input/output characteristics of the modulation layer 107.

The concrete value of "a" is equal to or more than 0.95 and less than or equal to 1.0 when actual dimensions of the element and dispersion characteristics thereof are taken into consideration. This value of "a" is satisfied to light having a wavelength such that the absorption coefficient in the photoconductive layer 103 is larger than the inverse number of the thickness thereof and an intensity at which the electric field thereof is not affected by space charges. The main factor causing the value of "a" to deviate from 1.0 may be loss of photogenerated carriers by trap and/or recombination. Accordingly, in order to make the value near to 1.0, it is desirable to use thin films having an excellent quality of film wherein there are no defects causing traps and/or recombination centers, or to make the photoconductive layer have a rectification property to form a depletion layer therein which isolates separate photocarriers just after generation to prevent them from recombining.

Materials for forming the photoconductive layer 103 are amorphous Si, Ge, $Si_{1-x}C_x$, $Si_{1-x}Ge_x$, $Ge_{1-x}C_x$ and the like containing hydrogen or halogen elements (herein after referred to as a-Si, a-Ge, a-$Si_{1-x}C_x$, a-$Si_{1-x}Ge_x$, a-$Ge_{1-x}C_x$ and so on). The dangling bond density is a known of the number of defects in the material mentioned above. This dangling bond density can be observed by ESR (Electron Spin Resonance). It was found by the inventors of the present invention experimentally that the value of "a" could have a value within a range from 0.95 to 1.0 by lowering the dangling bond value by less than $10^{16} cm^{-3}$ in the layer in which photo-carriers are generated and by making the layer have a rectifying property. In order to give a rectifying property to the layer, it is desirable to form junctions such as p/n, p/i, i/n, p/i/n and the like by adding one or more elements such as B, Al, Ga and the like as p-type impurities and/or one or more elements such as P, As, Sb, Se and the like as A-type impurities or to form Schottky junction by using a translucent thin film of gold or platinum as the semi-transparent conductive electrode 102. Further, it is also desirable to form a hetero junction by depositing thin films of different components mentioned above one on the other in such a manner that the width of forbidden band of each film is reduced in the order of deposition from the side of the transparent conductive electrode 102 and, thereby, to form a depletion layer in the photoconductive layer 103.

The light modulation layer 107 is made of a material, such as PLZT, $KD_2PO_4$, $Bi_4Ti_2O_{12}$, $LiNbO_3$, $Bi_{12}SiO_{20}$, liquid crystal or the like of which the light transmittance varies with an electric field applied thereto. Especially, the liquid crystal, when used for the modulation layer 107, is desirable to thin the photoconductive layer 103 since it is easily driven by a low applied voltage. Suitable for use as the liquid crystal are nematic, ferroelectric liquid crystals and polymer dispersed type liquid crystals. The ferroelectric crystal is especially advantageous in that it is possible to reduce the electric resistance as well as to thin the thickness of the photoconductive layer. Because the thickness of the liquid crystal layer can be relatively thin, a quick response is obtained as well as an improved memory function. Further, since the light transmittance of the ferroelectric liquid crystal has steep threshold characteristics against the voltage applied thereto, it is the best material for the optical threshold processing. The polymer dispersed type liquid crystal is advantageous because the polarizer and alignment layers can be omitted. If the modulation layer is made of a material other than liquid crystal, either or both of the transparent insulation substrates 101 and 105 can be omitted.

When the spatial light modulator shown in FIG. 1 is used as a reflective device, a dielectric mirror of alternately layered dielectric substances with different refractive indices is formed between the transparent conductive electrode pattern 104 and the modulation component 107, or a metallic thin film with high reflectivity, e.g., Ag, Al, Cr, Ni, or Mo, is formed in place of the transparent conductive electrode pattern 104.

To increase the resolution, a thin film with a band gap sufficiently smaller than that of the photoconductive layer 103 may be inserted between the photoconductive layer 103 and the transparent conductive electrode pattern 104 as a light absorbing layer to prevent reflection of the incident readout light 109.

The operation of a reflection-type spatial light modulator is basically the same as that of the transmission-type element shown in FIG. 1, but the write light is incident through the transparent insulated substrate 101, the readout light is incident from the transparent insulation substrate 105, and the output light is emitted from the transparent insulation substrate 105.

Specific embodiments of the present invention are described hereinbelow.

EMBODIMENT 1

Figure 2:
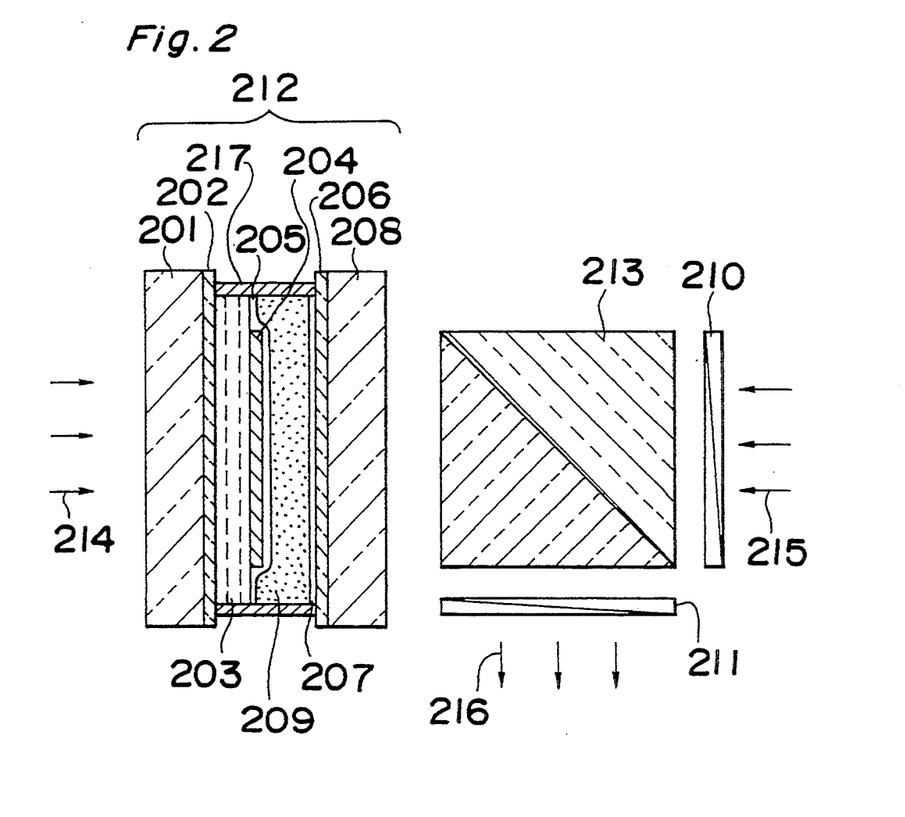
FIG. 2 is a cross section of a spatial light modulator according to a first preferred embodiment of the present invention.

As shown in the cross section in FIG. 2, a 0.05~0.5 μm thick ITO film is sputtered onto a glass substrate 201 to form the transparent conductive electrode 202. Next, a 0.5~2 μm thick p/i/n diode structure a-Si:H film is formed over the transparent conductive electrode 202 by plasma CVD to form the photoconductive layer 203. This is followed by forming a 0.05~0.5 μm thick aluminum electrode pattern 204, which is then covered by a rubbed polyimide alignment layer 205. Between this polyimide alignment layer 205 and a glass substrate 208 on which ITO transparent conductive electrode pattern 206 and polyimide alignment layer 207 are laminated is sandwiched a 0.5~2 μm thick ferroelectric liquid crystal layer 209 using a spacer 217 to form a spatial light modulator 212 of reflective type. On one side of this device is arranged a cross-Nicol optical system including a polarizer 210, an analyzer 211 and a beam splitter 213, to readout an output of the device.

Figure 3:
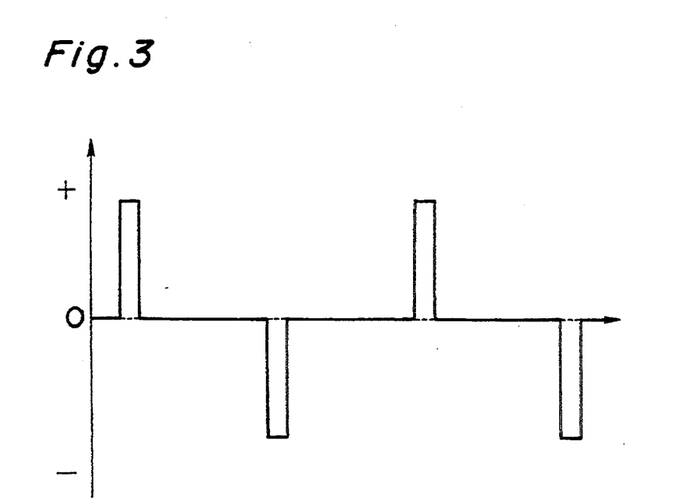
FIG. 3 is a waveform diagram of the voltage used in the first preferred embodiment of the present invention.

Some samples of the photoconductive layer 203 were made and tested to measure the value of the power "a" by irradiating the device with a variety of light rays having wavelengths ranging from 450 to 700 nm and intensities ranging from 5 to 100 μW/cm$^2$ while applying a DC reverse bias of $1 \times 10^4$ to $5 \times 10^4$ V/cm, and the value of "a" measured ranged from 0.96 to 0.99. The operation of the device was observed using the incident light 214 of green LED light having a central wave length of 565 nm and the reading light 215 of He-Ne laser of 633 nm while applying an AC voltage as shown in FIG. 3. As the result, it was confirmed that the intensity of the output light 216 exhibits a threshold property dependent only upon the incident light power to the Al electrode 204 region. Even if the distribution of intensity thereof is not identical, the optical summation for incident light and the optical thresholding operation for the result of the optical summation are executed. Further, it was confirmed that the optical summation and the optical thresholding operation can be made 10 to 5,000 times per second.

It is to be noted that an unobriquely evaporated $SiO_2$ film can be used in place of polyimide for the polyimide alignment layers 205 and 207. Furthermore, a $Ta_2O_5$, $Si_3N_4$, $SiO_2$ or similar high dielectric constant film of a thickness 100 to 1,000 μm can be formed between the transparent electrode pattern 206 and the alignment layer 207 to prevent electrical shorting of the liquid crystal layer.

A variety of samples were manufactured by varying the substrate temperature during photoconductive layer 203 formation between room temperature and 300° C., and the value of "a" and the electrical properties were investigated. It was found that when a $1 \times 10^4 \sim 5 \times 10^4$ V/cm reverse bias is applied and a 1 μW/cm$^2$ light (500~650 nm wavelength) is applied such that the ratio $\sigma_{ph}/\sigma_d$ of $\sigma_{ph}$ to the dark conductivity $\sigma_d$ is equal to or more than 10.0, the value of "a" is within the range 0.95~1.

The magnitude of the electric field was determined assuming the voltage applied to the spatial light modulator 212 is directly applied to the photoconductive layer 203. The spatial light modulator 212 operates normally when $\sigma_{ph}/\sigma_d \geq 10$. Further, it was found that the dangling bond density of the photoconductive layer 203 is smaller than $10^{15}$ cm$^{-3}$ and the quantum efficiency obtained from a light current flowing through the photoconductive layer 203 upon measuring $\sigma_{ph}$ is ranged from 0.80 to 0.98.

This is believed to be because when there are few traps in the film there is an increase in photoconductivity, the p/i/n bond interface becomes cleaner, and the reverse current when dark decreases.

EMBODIMENT 2

Figure 4:
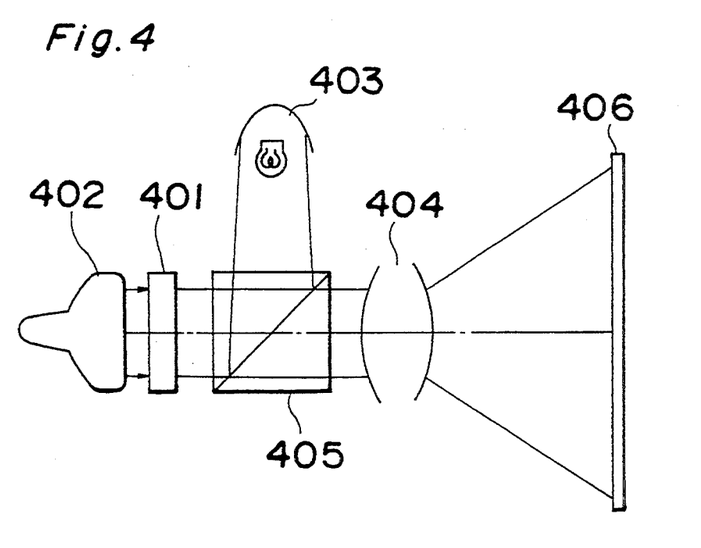
FIG. 4 is a schematic side view of a projection-type display apparatus using spatial light modulators according to a second preferred embodiment of the present invention.

A projection type display apparatus as shown in FIG. 4 was fabricated using a spatial light modulator 401 as shown in FIG. 2 wherein a plurality of Al electrodes 204 were arranged so as to form a two dimensional array in the spatial light modulator 212 according to the first embodiment, a CRT as a writing light source 402, a halogen lamp with a reflection mirror as a projecting light source 403, a projecting lens assembly 404, a polarization beam splitter 405 and a screen 406. It was observed that an image displayed on the CRT 402 projected on the screen in an enlarged scale.

EXAMPLE 3

Figure 5:
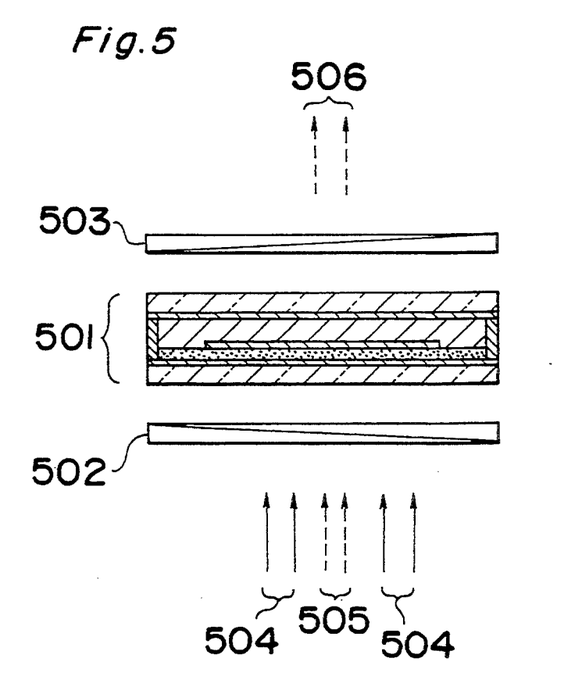
FIG. 5, is a cross-sectional view of a transmissive-type spatial light modulator according to a third preferred embodiment of the present invention.

A spatial light modulator 501 of transmissive type as shown in FIG. 5 was prepared by replacing the Al electrode 204 of the device 212 according to the embodiment 1 (see FIG. 2) to an ITO transparent conductive electrode and the photoconductive layer 203 to an a-$Si_{0.8}C_{0.2}$:H film having a diode structure of p(0.01~0.3 μm)/i(0.3~1.2 μm)/n(0.05~0.3 μm). Further, polarizer 502 and analyzer 503 are arranged on the both sides of the modulator 501, respectively. The output light 506 transmitted through the device 501 was observed while impinging an incident light 504 emitted from a green LED (of a central wavelength 565 nm) and a readout light 505 emitted from a red LED (of a central wavelength 665 nm) simultaneously from the same side to investigate the relationship of the intensity of the output light to the power of the incident light. As the result, it was confirmed that the device 501 can execute the optical summation and optical thresholding operation similarly to the embodiment 1.

The value of "a" of the a-$Si_{0.8}C_{0.2}$:H diode was found to be 0.95 to 1.00 when an incident light of a wavelength 400 to 650 nm and an intensity 5 to 100 μW/cm$^2$ was illuminated while applying a reverse DC bias of $1 \times 10^4$ to $1 \times 10^5$ V/cm.

EMBODIMENT 4

Figure 6:
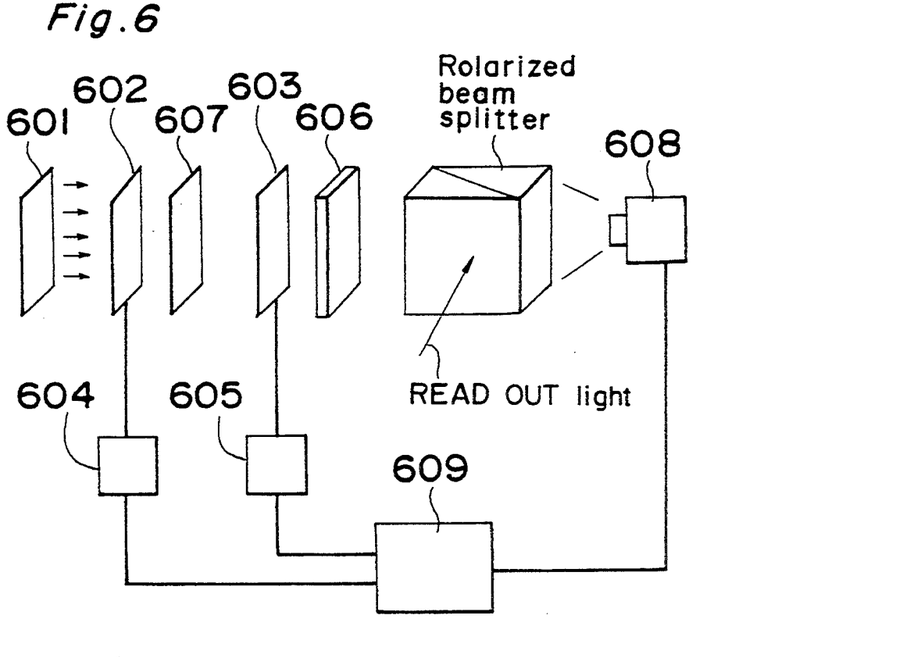
FIG. 6 is a schematic perspective view of a neural network according to a fourth preferred embodiment of the present invention.
Figure 7:
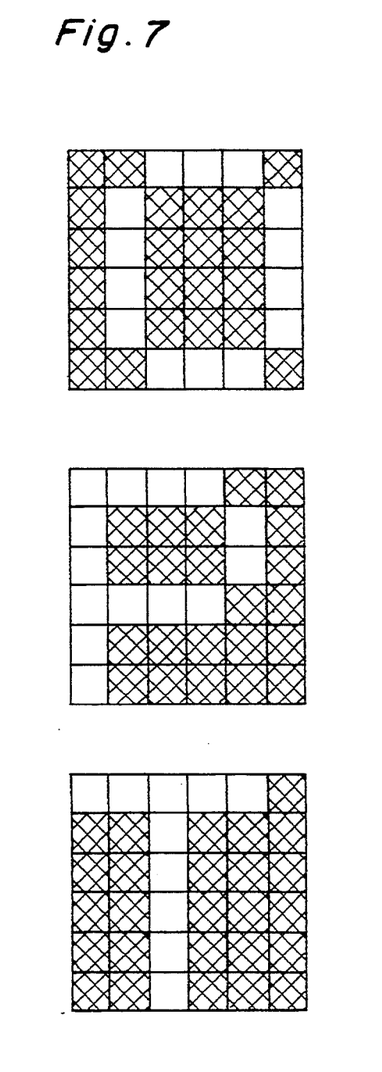
FIG. 7 shows patterns memorized in the neural network circuit of FIG. 6.

A first embodiment of a neural network circuit according to the present invention is described hereinbelow with reference to FIGS. 6 to 9. FIG. 6 is a simplified illustration of the neural network system, FIG. 7 shows an example of the patterns stored in the system, FIG. 8 shows a multiimage of input pattern, and FIG. 9 is an example of the incomplete patterns used in the tests.

A flat light emitting element 601 comprising a two-dimensional array of light-emitting diodes, electroluminescent elements or fluorescent lights, and a flat diffusion panel, and two active matrix liquid crystal cells (hereinafter AM-LC) each comprising a-Si:H or a polycrystalline Si transistor array as active elements and a nematic liquid crystal with a 90° twist (AM-LC(1) 602 and AM-LC(2) 603 hereinafter) are arranged parallel to each other. However, the first AM-LC(1) 602 is used as a display device of an input pattern and the second AM-LC(2) 603 is used as an optical mask element corresponding to a synapse, and is learnable. Furthermore, the pixels in the AM-LCs 602 and 603 are arrayed 420×740, and are driven independently by drive circuits 604 and 605. In addition, a spatial light modulator array 606 of thirty six spatial light modulators manufactured as described in the first embodiment hereinabove and arrayed in a flat matrix of 6×6 is positioned parallel to AM-LC(1) 602 and AM-LC(2) 603, thus forming the neural network. The principle of neural network operation (using an associative memory function as an example of the function of the nervous system) is described next with reference to FIGS. 6 to 9. An input pattern ($X_1$) of a 6×6 matrix (=36 elements), e.g., one of the patterns shown in FIG. 7 (e.g., the top pattern), is displayed on the AM-LC(1) 602. The elements of the $X_{1L}$ and those of the memory pattern M of a 36×36 matrix displayed by the AM-LC(2) are arranged to have a one to one correspondence.

Figure 8:
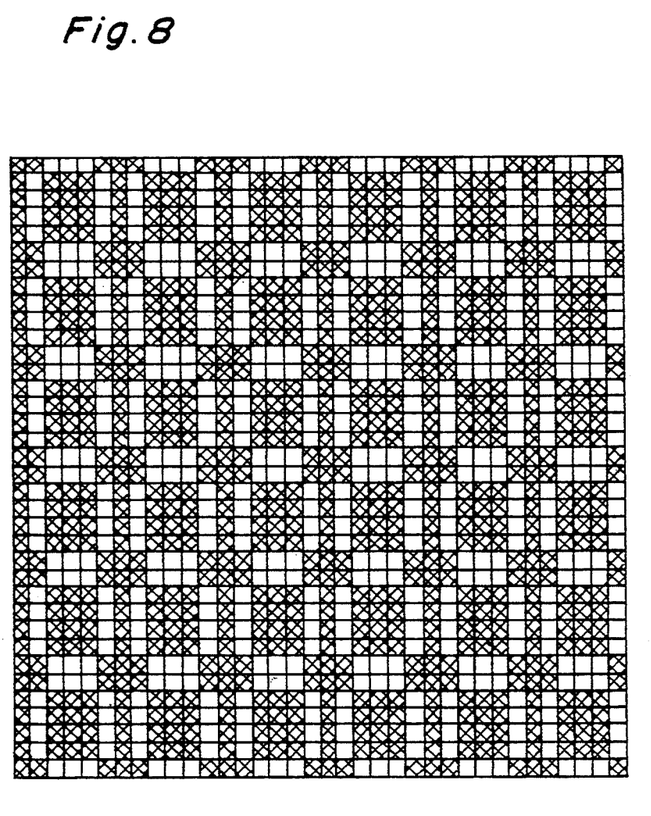
FIG. 8 shows a multiimage of an input pattern.
Figure 9:
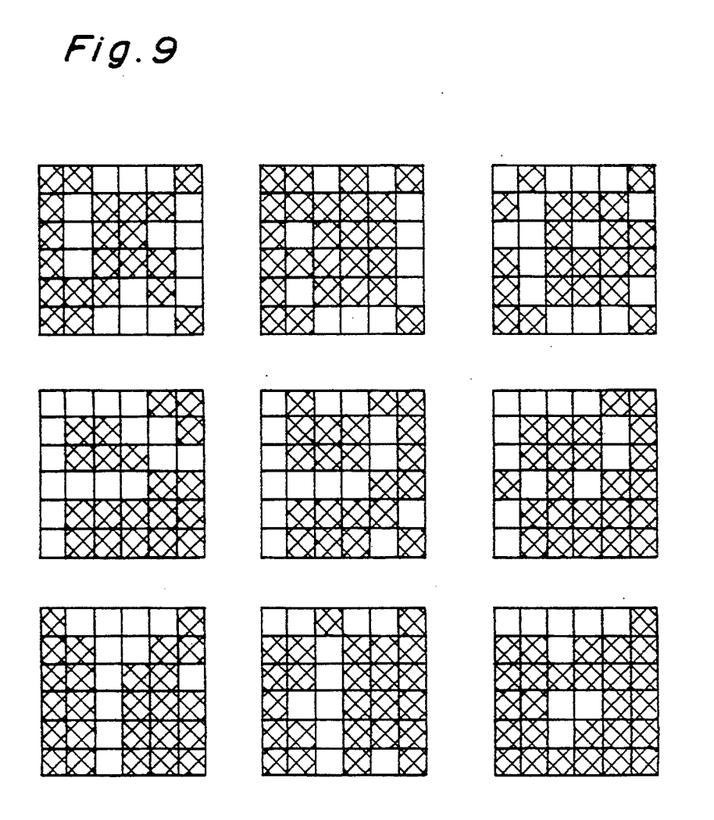
FIG. 9 shows incomplete patterns used in an experiment made using the neural network circuit of FIG. 6.

This input pattern $X_1$ is converted by a lenslet array 607 of a 6×6 matrix to a multiimage $X_{1L}$ of a 36×36 matrix as shown in FIG. 8. The image transmitted through the matrix is shown in FIG. 8. The image transmitted through the AM-LC(2) 603 contains individual products of corresponding elements of $X_{1L}$ and M (represented as $X_{1L} \otimes M$). $X_{1L} \otimes M$ is a 36×36 matrix, in other words, small matrices each of a 6×6 matrix are arranged in a form of 6×6 matrix.

Each of the 6×6 matrices in the $X_{1L}$ and M matrices are arranged to focus on the photoconductive layer of one element in the array 606. Thus, one photoconductive layer within one A1 electrode optically sums one 6×6 matrix and, further, the corresponding ferroelectrical iquid crystal layer executes an optical thresholding operation for the optical summation obtained. The output pattern from the spatial light modulator array 606 was detected by a television camera 608 using a cross-Nicol optical system and a white luminescent lamp as a readout light to obtain a recalling result $Y_1$ in a form of 6×6 matrix. If the result $Y_1$ coincides with the input pattern $X_1$, the next pattern is recalled. If not, the memory pattern M is recorrected by learning. A computer 609 is used for calculating recorrection values for the memory pattern and for controlling the first and second AM-LC(1) and (2); 602 and 603. The orthogonal learning method was used as an example of learning. The learning was repeated, starting from a zero matrix as an initial state of the memory pattern matrix M, until the output Y becomes coincident with the input X. Using the patterns M obtained by the learning and an incomplete pattern of $X_1$ (e.g., a pattern as shown in FIG. 9), the neural network circuit was able to correctly recall the pattern $X_1$. In addition, it was possible to recall the complete pattern from an incomplete input pattern for other tested patterns. It was thus confirmed that the system which can perform associative memory operations similar to those of the nervous system can be formed using spatial light modulators having a thresholding operation function.

It is to be noted that a ferroelectric liquid crystal can also be used in place of nematic liquid crystals for the AM-LC(1) 602 and AM-LC(2) 603 in order to increase the processing speed.

Furthermore, it was confirmed that associative memory function for a larger number of more complex patterns is also possible by increasing the matrix size of the input pattern, accordingly increasing the number of photoconductive layers contained in the spatial light modulator, and using these devices to form the neural network.

In addition, if a lens is formed on each single element on the glass substrate of the AM-LC(2) 603 side of the spatial light modulator array 606, a drop in the light level caused by light diffusion and optical crosstalk can be reduced, enabling even faster training and good output results with incomplete patterns.

A liquid crystal, one type of material for which the transmission of light can be changed by applying an electrical field, was used as an optical mask corresponding to synapses in the above embodiment, but a photochromic element for which the transmission of light can be changed by exposure to light can also be used.

Furthermore, in the case of a neural network circuit which is not designed to perform learning, a non-rewritable fixed mask of a fixed silver halide or pigment or of an evaporated deposition metal is used for the optical mask. In this case, the fixed mask is filled with the values of synapses obtained by computer simulations of training. At this time if the fixed mask is outside the spatial light modulator array 606, light diffusion results in a drop in the light level and optical crosstalk because the element is generally smaller than the thickness of the glass in the spatial light modulator array 606, making it difficult to obtain results according to the simulation. To prevent this, it is effective to form the fixed mask in the spatial light modulator array 606, specifically in the incident light side glass water 201, (see FIG. 2) between the glass wafer on the incident light side and the transparent conductive electrode 202, or between the transparent conductive electrode 202 on the incident light side and the photoconductive layer 203. It is also effective to add the above lenses to the glass wafer of the spatial light modulator array 606. It was also confirmed that the same results as the simulation results can be obtained by these methods.

EMBODIMENT 5

Figure 10A:
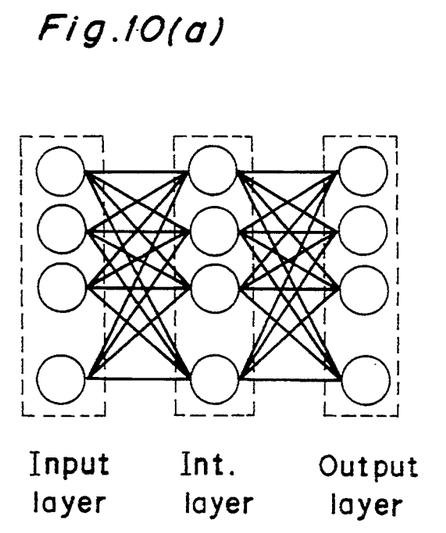
FIG. 10(a) is a diagram of a hierarchic neural network system and FIG. 10(b) is a schematic perspective view of the hierarchic neural network circuit realizing the neural network system shown in FIG. 10(a)
Figure 10B:
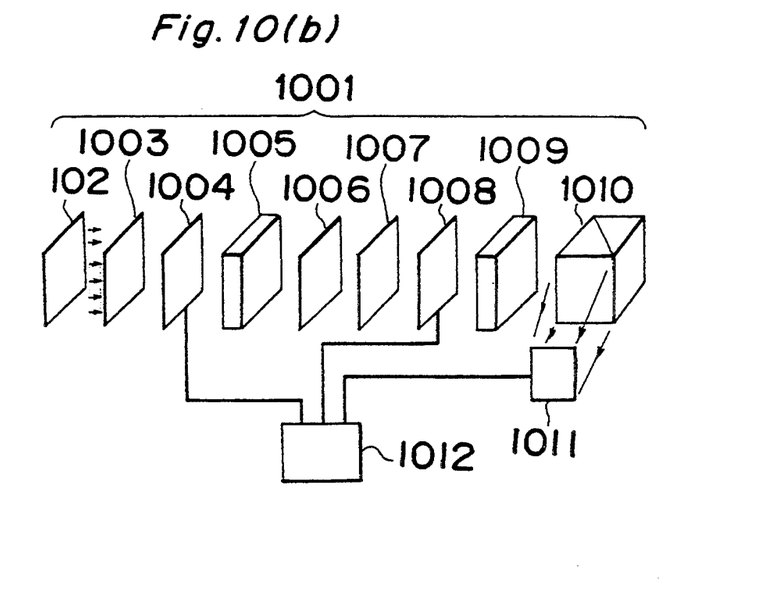

A neural network circuit 1001 in FIG. 10(b) based on a hierarchical neural network model as shown in FIG. 10(a) was constructed using reflection-type spatial light modulators according to the first embodiment and transmission-type spatial light modulators according to the third embodiment.

The construction of this circuit is described first with reference of FIG. 10(b). The 8×8 matrix input data (X) is displayed on a flat light source 1002 (for instance CRT, LED array or EL array), and a multiple image $X_L$ is focused on the AM-LC(1) 1004 through a lenslet array 1003 having an arrangement in a form of a 8×8 matrix as described with respect to the fourth embodiment above. The flat light source 1002 and lenslet array 1003 correspond to the neurons of the input layer (in this case there are sixty neurons), and the AM-LC(1) 1004 is used as the re-writable optical mask corresponding to the synapses between the input layer and the middle layer. Weighting factors for the synapses displayed on the AM-LC(1) 1004 are given in a form of a 64×64 matrix. The flat light source 1002 has two different wavelength components $\lambda_1$ and $\lambda_2$, and one of two polarizers sandwiching the AM-LC(1) 1004 has a transmittance dependent on the wavelength of light so as to polarize light of a specific wavelength (e.g., $\lambda_1$) while permitting virtually all light of the other wavelength ($\lambda_2$) to pass without any polarization. In this case, it corresponds to the polarizer arranged between an SLM array (1) 1005 and a color filter 1006. The polarizer arranged between the AM-LC(2) 1008 and an SLM array (2) 1009 polarizes light of the wavelength $\lambda_2$. Therefore, light of the one wavelength $\lambda_1$ is modulated by the AM-LC(1) 1004, but light of the other wavelength $2_2$ is transmitted regardless of the operating state of the liquid crystal layer. The light passing through the AM-LC(1) 1004 is incident upon the spatial light modulator array (hereinafter SLM array) (1) 1005 consisted of transmission-type spatial light modulators according to the fourth embodiment in a 8×8 matrix. The material used to form the photoconductive layer absorbs $\lambda_1$ wavelength light and allows $\lambda_2$ wavelength light to pass. This SLM array (1) 1005 corresponds to the neurons in the middle layer (in this case there are sixty four neurons). The light passing through the SLM array (1) 1005 has filtered off any $\lambda_2$ wavelength component as it passes the color filter 1006, and only the $\lambda_2$ component passes. The light passing from the color filter 1006 is distributed by a 6×6 matrix lenslet array 1007 onto the 36×36 matrix display AM-LC (2) 1008, which is formed using a re-writable optical mask corresponding to the synapses between the middle layer and the output layer. The light passing from the AM-LC (2) 1008 is incident upon the reflection-type 6×6 matrix SLM array (2) 1009 used in the fourth embodiment above.

The photoconductive layer of the SLM array (2) 1009 is formed from a material with good $\lambda_2$ wavelength light absorption characteristics. The SLM array (2) 1009 corresponds to the neurons in the output layer (in this case there are thirty six neurons). The output light from the SLM array (2) 1009 passes a beam splitter 1010, and is detected by a 4×4 matrix photodiode array (hereinafter PDA) 1011. The SLM arrays (1) 1005 and (2) 1009 obtain the optical summation, and output the result of a thresholding operation applied thereto. The synapse correction to be applied to the signal from the PDA 1011 is calculated by the electronic computer 1012 to train the AM-LC(1) 1004 and AM-LC (2) 1008 using a feedback-type learning method (e.g., error back propagation method).

This system forms a neural network from sixty four neurons each in the input layer and middle layer, and thirty six neurous in the output layer.

A learning operation was made in the neural network circuit 1001 using twenty six alphabetical characters each represented in a form of a 8×8 matrix and, thereby, display contents of the AM-LC(1) 1004 and AM-LC(2) 1008 were corrected. As the result of the learning, all of twenty six characters were recognized correctly. When incomplete character patterns were input to the neural network circuit after the completion of the lerning, a recognition rate of greater than 95.0% was obtained with respect to incomplete patterns having a Hamming distance within five.

Thus, a hierarchical neural network can be easily constructed by alternating layers of AM-LC or other transmission-type spatial light modulators and SLM arrays if plural wavelength light sources are used for the input light and the materials of the photoconductive layer used in the SLM array are arranged in order of lower band gap in the direction of light travel. Furthermore, the same effect can be obtained when the matrix size of the AM-LC and SLM arrays in the neural network circuit 601 is made larger, and by increasing the number of AM-LC and SLM array pairs, the number of levels can be increased and functionality improved.

Furthermore, the same effect was obtained using the other optical masks used in the fourth embodiment above in place of the AM-LC.

In addition, if lenses are formed on the glass wafer of the SLM arrays (1) 1005 and (2) 1009, learning can be focused more efficiently and the recognition rate improved.

Furthermore, when the training results obtained through computer simulations were produced in a fixed mask which was used in place of the AM-LC(1) 1004 and AM-LC (2) 1008 between the glass wafer of the SLM arrays (1) 1005 and (2) 1009 and the transparent conductive electrode or between the transparent conductive electrode and the photoconductive layer, recognition results faithful to the simulation results were obtained.

A spatial light modulator according to the present invention operates to obtain an optical summation and thresholding operation while featuring high speed operation and mass manufacturability, and facilitates the simple construction of neural networks on a hierarchical network model.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A neural network comprising:
   an input layer having a plurality of electrically addressed spatial light modulator units for outputting light information by transforming input electric signal information;
   an optical mask for receiving and modulating siad light information from said input layer;
   at least one intermediate layer having a plurality of spatial light modulator units for receiving said modulated light information from said optical mask;
   a further optical mask for receiving and modulating light information from said at least one intermediate layer; and
   an output layer having a plurality of spatial light modulator units for receiving said modulated light information from said further optical mask;
   wherein each spatial light modulator unit of said at least one intermediate layer and said output layer includes:
   a photoconductive layer that generates a photocurrent responsive to an intensity of the light incident thereto, said photoconductive layer having a photoconductivity $\sigma_{ph}$ with the relationship of log $(\sigma_{ph})$=a·log $(I_{ph})$, wherein $I_{ph}$ is the intensity of light incident thereon and at least within the range of 5 to 50 $\mu W/cm^2$ with the wavelength between 500 and 600 nm and "a" is a value within a range from 0.95 to 1.0;
   a light modulation layer electrically contacting said photoconductive layer, which varies a light transmittance in accordance with a voltage applied thereto; and
   a pair of electrically conductive electrodes which sandwich said photoconductive layer and said light modulation layer for applying a voltage to the sandwiched layers;
   whereby light information incident to said photoconductive layer are summed as photocurrents induced therein, and wherein said voltage applied to said light modulation layer is varied in accordance with the sum of said photocurrents to yield a light transmittance dependent on the total of said incident light information.

2. The neural network as claimed in claim 1 wherein said photoconductive layer has a rectifying property.

3. The neural network as claimed in claim 2 wherein said photoconductive layer is made of an amorphous semiconductor material containing at least one material chosen from a group consisting of carbon, silicon and germanium.

4. The neural network as claimed in claim 2 wherein the ratio of $\sigma_{ph}$ to a dark conductivity is 10 or larger when a DC reverse bias with an electric field between $1 \times 10^4$ V/cm and $5 \times 10^4$ V/cm is applied to said photoconductive layer and 1 $\mu W/cm^2$ of light of wavelength between 500 and 600 nm at least is incident thereon, wherein $\sigma_d$ is lower than $1 \times 10^{-11}$ S/cm.

5. The neural network as claimed in claim 1 wherein said light modulation layer is made of a ferroelectric liquid crystal.

* * * * *